Sept. 3, 1963     R. E. KNIGHT, JR., ETAL     3,102,545
VEHICLE WASHING APPARATUS
Filed July 20, 1962
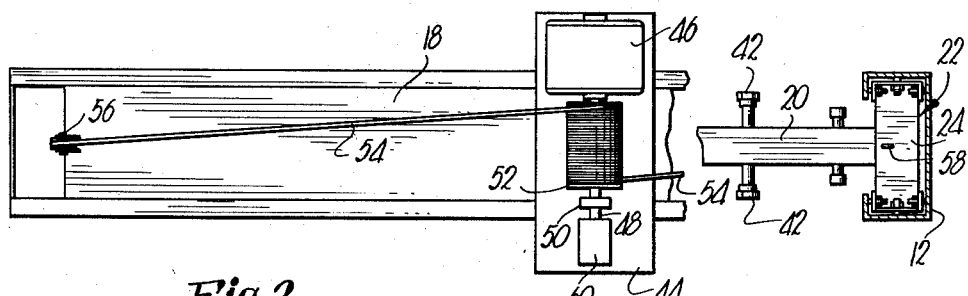
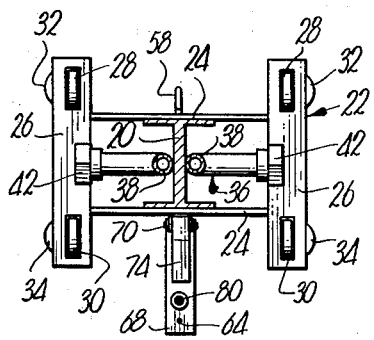
INVENTORS.
Randall E. Knight Jr.
BY Gelder V. Lewis
Hovey, Schmidt, Johnson & Hovey.
ATTORNEYS.

United States Patent Office 3,102,545
Patented Sept. 3, 1963

3,102,545
VEHICLE WASHING APPARATUS
Randall E. Knight, Jr., Prairie Village, and Gelder V. Lewis, Mission, Kans., assignors to American Truck Washing and Detergent Co., Kansas City, Mo., a corporation of Missouri
Filed July 20, 1962, Ser. No. 211,212
7 Claims. (Cl. 134—45)

This invention relates to vehicle washing apparatus, and more particularly, to apparatus for washing the front and rear ends of a vehicle by means of a high pressure stream of cleaning fluid.

It is the primary object of the present invention to provide vehicle washing apparatus for directing a stream of cleaning fluid under pressure toward and against one end of a vehicle, whereby such end of the vehicle is washed, and manual washing thereof which was heretofore required, is obviated. Thus, the present invention is adaptable for use in automatic vehicle washing establishments and represents an improvement over vehicle washing techniques heretofore employed in such establishments.

A further object of the present invention is the provision of vehicle washing apparatus of the aforesaid character which is provided with a fluid delivery unit capable of directing cleaning fluid in opposed directions, whereby a single unit is required for washing both the front and rear ends of a vehicle. Thus, the need for an additional unit is eliminated.

Yet another object of the present invention is the provision of an elongated beam for carrying fluid delivery means and movable in up and down directions in a plane normal to the path of travel of the vehicle whereby the front end of the vehicle may be washed when the vehicle is disposed on one side of the beam and fluid delivery means, and the rear end of the vehicle may be washed when the vehicle is on the opposite side of the beam and fluid delivery means.

Still another object of the present invention is the provision of safety means carried by the beam for movement therewith and spaced therebelow, whereby movement of the beam is halted in the event that the safety means engages any projecting portions of the vehicle to thereby assure that the apparatus will not be damaged during normal operation thereof.

A further object of the present invention is the provision of support means for mounting the beam across the normal path of travel of the vehicle and for permitting the beam to move along a path extending from a location above the vehicle to a position adjacent the surface over which the vehicle moves, whereby one end of the vehicle may be washed as the beam moves downwardly and then upwardly, and the opposite end of the vehicle may be washed in a similar manner after the vehicle has passed beneath the beam to position the opposite end so as to be contacted by the fluid issuing from the fluid delivery means carried by the beam.

Other objects of the present invention will become apparent as the following specification progresses, reference being had to the accompanying drawing, wherein:

FIGURE 1 is an elevational view of the vehicle washing apparatus of the present invention and illustrating the structure utilized for washing one end of a vehicle shown in dashed lines;

FIG. 2 is a top plan view of the vehicle washing apparatus and illustrating the power means for moving fluid delivery means in up and down directions, parts being broken away and in section to illustrate details of construction;

FIG. 3 is an enlarged, fragmentary, cross-sectional view of the fluid delivery means and the structure coupled therewith for advancing the same in up and down directions;

FIG. 4 is a cross-sectional view of the structure for moving the fluid delivery means and illustrating safety means on the structure for protecting the apparatus in the event that the vehicle is improperly positioned relative thereto;

FIG. 5 is a fragmentary, elevational view of the vehicle washing apparatus and illustrating the interconnection of the power means with the fluid delivery means to effect the up and down movements of the latter; and FIG. 6 is a cross-sectional view similar to FIG. 4 and illustrating the end of the structure for moving the fluid delivery means opposite to the end illustrated in FIG. 4.

The present invention provides vehicle washing apparatus adapted for cleaning the front and rear ends of a vehicle, and is especially suitable for use in automatic vehicle washing establishments. Fluid delivery means is carried by a beam mounted adjacent the ends thereof on a pair of spaced, upright supports normally disposed on opposed sides of the normal path of travel of the vehicle. Means is provided for moving the beam up and down so that the fluid delivery means, including oppositely directed nozzles, may first wash one end of the vehicle and then the other end of the latter after the vehicle has been moved so as to position the other end properly with respect to the corresponding nozzles.

Safety means, including an elongated wire, is carried by the beam below the latter for engaging any projecting parts of the vehicle in the event that the latter is improperly positioned with respect to the apparatus so that the means for moving the beam will be rendered inoperative so as to prevent damage to the apparatus or vehicle.

This is a continuation-in-part of the copending application, Serial No. 135,850, filed September 5, 1961, and entitled, "Truck Washing Apparatus" and now abandoned.

The vehicle washing apparatus which forms the subject of the present invention is broadly denoted by the numeral 10 and includes a pair of upright supports 12 in the nature of channel members as clearly seen in FIG. 2. Members 12 are normally positioned on a surface 14 over which a vehicle 16, shown in dashed lines in FIG. 1, passes, it being clear that members 12 are disposed on opposed sides of the normal path of travel of vehicle 16. A crosspiece 18 interconnects the upper ends of members 12 and is spaced above the top of vehicle 16 to permit the latter to pass between members 12.

An elongated I-beam 20 is carried by roller structure 22 at each end thereof by members 12, as is clear in FIGS. 2 and 5. Each of said structures 22 includes a pair of vertically spaced plates 24 secured to the normally upper and lower flanges of beam 20 and extending transversely of the latter in opposed directions, as is clear in FIG. 3. A channel element 26 is secured to corresponding ends of plates 24 and is, therefore, spaced from beam 20 as is clear also in FIG. 3. Elements 26 are configured to be complementally received within a corresponding member 12 as is clear in FIG. 2, and to this end, each element 26 is provided with an upper pair of opposed rollers 28, a lower pair of opposed rollers 30, and upper and lower central rollers 32 and 34 horizontally aligned with rollers 28 and 30 respectively. When each structure 22 is disposed within the corresponding member 12, rollers 28, 30, 32 and 34 engage the proximal portions of member 12 to permit structure 22 to readily move in an up and down direction relative to the corresponding member 12. Since plates 24 are rigid to beam 20, the latter is movable with elements 26 as the latter shift with respect to the corresponding member 12.

Fluid delivery means, broadly denoted by the numeral 36, is carried by beam 20 for movement therewith.

Means 36 includes a pair of elongated conduits 38 disposed on opposed sides of beam 20 as is clear in FIG. 3. Conduits 38 extend substantially the length of beam 20, as is clear in FIG. 1, and are adapted to be operably coupled by means of laterally extending tubes 40 to a source of cleaning fluid under pressure disposed adjacent apparatus 10.

Each conduit 38 is provided with a number of longitudinally spaced, fluid delivery nozzles 42 extending outwardly from beam 20 in the manner shown in FIG. 2. Nozzles 42 are disposed along the corresponding conduit 38 so that the high pressure stream of cleaning fluid issuing therefrom is sufficient to blanket the end of vehicle 16 disposed adjacent the path of up and down movement of beam 20.

A platform 44 is carried by crosspiece 18 intermediate the ends of the latter. A reversible electric motor 46 is carried on platform 44 and is provided with a drive shaft 48 carried in bearing 50 secured to platform 44. A cable reel 52 is rigid to shaft 48, and a pair of cables 54 are wound about reel 52 for movement onto reel 52 when shaft 48 rotates in one direction and for movement in opposite directions when shaft 48 rotates in the opposite direction.

Cables 54 extend away from reel 52 along the length of crosspiece 18 and pass over pulleys 56 disposed at the outer ends of crosspiece 18. The outer ends of cables 54 are secured to eyelets 58 on the upper plates 24 of structures 22. Beam 20 is, therefore, disposed for up and down movement relative to members 12 when motor 46 is energized. A limit switch 60 is operably coupled with shaft 48 and adapted to be operably coupled with control structure adjacent apparatus 10 for limiting the number of revolutions of shaft 48 to thereby limit the extent of up and down movement of beam 20.

Safety means broadly denoted by the numeral 62, is carried by beam 20 for movement therewith. Means 62 includes an elongated wire 64 which is substantially parallel with beam 20 below the latter. The ends of wire 64 are secured to arms 66 and 68, arm 66 being rigid to beam 20 adjacent one end thereof, and arm 68 being swingable about a pivot 70 on beam 20 for movement about a horizontal axis, as is clear in FIG. 4.

An electrical switch 72 carried on beam 20 by means of a bracket 74, is disposed adjacent arm 68. Switch 72 is provided with a shiftable pole 76 engaged by arm 68 as the latter swings in a clockwise sense when viewing FIG. 4. Switch 72 is adapted to be operably coupled with motor 46 for deenergizing the latter when arm 68 swings in a direction so as to engage pole 76. Arm 68 is biased away from switch 72 by means of a spring 78 carried by a bolt 80 secured to a bracket 82 depending from beam 20.

In operation, apparatus 10 is utilized for washing the front and rear ends of vehicle 16. To this end, vehicle 16 is driven to a position where the front or rear end thereof is disposed adjacent and in spaced relationship to beam 20 along a line passing between members 12. The control circuitry associated with apparatus 10 is actuated so as to energize motor 46 and to cause cleaning fluid under pressure to be delivered to the nozzles 42 which are directed toward and against the end of the vehicle to be washed. Beam 20 is thus caused to move in up and down directions to direct the streams of cleaning fluid issuing from corresponding nozzles 42 against the vehicle, whereby the impinging of the fluid on the end of the vehicle is sufficient for dislodging dirt and other foreign matter to thereby wash the end of the vehicle. After one end of vehicle 16 has been sufficiently washed, vehicle 16 is then moved so that the opposite end thereof is on the opposite side of beam 20, whereupon motor 46 is again energized and fluid is delivered to the opposite nozzles 42 which are now directed against the opposite end of vehicle 16. The washing of the vehicle proceeds until the corresponding end thereof is sufficiently clean, whereupon vehicle 16 moves away from apparatus 10.

It is to be noted that the control circuitry for energizing motor 46 and for delivering fluid to conduits 38, may well take the form of photoelectric devices responsive to the position of vehicle 16 with respect to apparatus 10.

In the event that vehicle 16 is improperly positioned relative to apparatus 10 so that portions of vehicle 16 underlie beam 20, wire 64 will engage such projections to actuate switch 72 and thereby de-energize motor 46 to prevent further downward movement of beam 20. Thus, damage to vehicle 16, as well as to apparatus 10, is prevented.

It is further to be noted that fluid delivery to nozzles 42 may be interrupted by suitable control means during any part of the up and down movement of beam 20 so that fluid may not be directed against portions of vehicle 16 which may be damaged by the high pressure streams of cleaning fluid, such as air-conditioning systems or the like.

Having thus described the invention, what is claimed as new and desired to be secured by Letters Patent is:

1. Vehicle washing apparatus comprising a pair of spaced, upright supports adapted to be disposed on opposed sides of the path of travel of a vehicle to permit said vehicle to pass therebetween;

an elongated beam;

means carried by the beam adjacent the ends thereof and coupled with respective supports for shiftably mounting said beam on said supports for up and down movement relative thereto;

power means on the supports and coupled with said mounting means for reciprocating the latter and thereby shifting said beam; and a pair of fluid delivery nozzles secured to said beam and extending outwardly therefrom in opposed directions, said nozzles adapted to be coupled with a source of cleaning fluid under pressure and disposed for directing said fluid under pressure outwardly from said beam in said directions and toward said vehicle to thereby wash the latter.

2. Vehicle washing apparatus as set forth in claim 1, wherein said fluid delivery means includes a pair of fluid delivery conduits extending along the length of said beam, there being a number of spaced nozzles on each of said conduits in fluid communication therewith, the nozzles of one of said conduits extending outwardly from said beam in a direction substantially opposite to the direction in which the nozzles of the other conduit extend.

3. Vehicle washing apparatus as set forth in claim 1, wherein said mounting means includes roller structure engageable with a corresponding support and movable relative thereto, and including cable means for interconnecting said power means with said roller structure to permit reciprocation of said roller structure and thereby said beam relative to said supports.

4. Vehicle washing apparatus as set forth in claim 1, wherein is included safety means carried by said beam along the length thereof and operably coupled with said power means for interrupting the operation of the latter when said safety means engages said vehicle.

5. Vehicle washing apparatus as set forth in claim 4, wherein said safety means includes an elongated wire carried below and spaced from said beam, and electrical switching means for coupling said wire with said power means, said wire being disposed to be deflected for actuating said switching means when said wire engages said vehicle.

6. Vehicle washing apparatus as set forth in claim 5, there being an arm pivotally mounted on said beam and coupled with said switching means, one end of said wire being secured to said arm and disposed for pivoting the latter to actuate said switching means when said wire engages said vehicle.

7. Apparatus for washing the front or the back of a vehicle movable along a path of travel on a supporting surface, said apparatus comprising:
- a pair of stationary, upright, horizontally spaced members adapted to be mounted on said surface and having opposed, horizontally spaced, proximal margins adapted to extend upwardly from said supporting surface and defining an area permitting free passage of the vehicle therebetween along said path;
- an elongated beam of a length to span the distance between said support members;
- means mounting the beam on the support members in generally horizontal disposition and for movement along an upright path to substantially traverse the front or back surface of the vehicle;
- power means operably coupled to said beam for shifting the latter from an initial upper position clearing a vehicle moving along said path, to a lower location adjacent said supporting surface, and for returning the beam to said initial position thereof, said power means being operable to move the beam substantially continuously downwardly from said position of the same to said location thereof, and for continuously moving the beam during return of the same to the initial position thereof;
- a plurality of individual fluid delivery nozzles mounted on the beam in horizontally spaced relationship and positioned to direct cleaning fluid under pressure toward and against either the front or back surface of said vehicle as the beam is reciprocated by said power means; and
- manifold means connected to all of said delivery nozzles and adapted to be coupled to a source of high pressure cleaning fluid for simultaneous direction of said cleaning fluid to all of said delivery nozzles, a sufficient number of said delivery nozzles being provided on said beam in an arrangement to effect direction of said high pressure cleaning fluid against the front or back of said vehicle across the entire width thereof as the beam is reciprocated by said power means.

References Cited in the file of this patent

UNITED STATES PATENTS

| | | |
|---|---|---|
| 998,579 | Herz | July 18, 1911 |
| 1,928,621 | Frede | Oct. 3, 1933 |
| 2,689,577 | Dunn | Sept. 21, 1954 |
| 2,736,671 | Ransburg | Feb. 28, 1956 |

FOREIGN PATENTS

| | | |
|---|---|---|
| 361,525 | Great Britain | Nov. 26, 1931 |